US012761078B2

(12) United States Patent
Hansson

(10) Patent No.: US 12,761,078 B2
(45) Date of Patent: Oct. 13, 2026

(54) DEVICE FOR SMOOTHING SPECTRAL TRANSMISSION MODULATIONS AND A METHOD THEREOF

(71) Applicant: Neola Medical AB, Lund (SE)

(72) Inventor: Martin Hansson, Södra Sandby (SE)

(73) Assignee: NEOLA MEDICAL AB, Lund (SE)

(*) Notice: Subject to any disclaimer, the term of this patent is extended or adjusted under 35 U.S.C. 154(b) by 146 days.

(21) Appl. No.: 17/756,893

(22) PCT Filed: Oct. 15, 2020

(86) PCT No.: PCT/EP2020/079112

§ 371 (c)(1),
(2) Date: Jun. 3, 2022

(87) PCT Pub. No.: WO2021/110312

PCT Pub. Date: Jun. 10, 2021

(65) Prior Publication Data

US 2023/0012267 A1 Jan. 12, 2023

(30) Foreign Application Priority Data

Dec. 6, 2019 (SE) .................................. 1951408-2

(51) Int. Cl.
*G01J 3/02* (2006.01)
*G01J 3/433* (2006.01)
(Continued)

(52) U.S. Cl.
CPC ........... *G01J 3/0218* (2013.01); *G01J 3/0297* (2013.01); *G01J 3/433* (2013.01); *G01N 21/39* (2013.01); *G01L 1/245* (2013.01); *G01M 11/088* (2013.01)

(58) Field of Classification Search
CPC ........ G01J 3/0218; G01J 3/0297; G01J 3/433; G01N 21/39; G02B 6/3502; G01L 1/245; G01M 11/088
(Continued)

(56) References Cited

U.S. PATENT DOCUMENTS 4,636,070 A 1/1987 Ide
4,729,630 A 3/1988 Martinez
(Continued)

FOREIGN PATENT DOCUMENTS

CN 108534809 A 9/2018
GB 2536801 B 11/2020
(Continued)

OTHER PUBLICATIONS

Zlodeev, Ivan Vladimirovich, and Oleg V. Ivanov. "Transmission spectra of a double-clad fibre structure under bending." Quantum Electronics 43.6 (2013): 535. (Year: 2013).*
(Continued)

*Primary Examiner* — Michelle M Iacoletti
*Assistant Examiner* — Noah J. Haney
(74) *Attorney, Agent, or Firm* — Knobbe, Martens, Olson & Bear, LLP

(57) ABSTRACT

A device, system and method for smoothing spectral transmission modulations in an optical fiber which includes at least one holder for coupling a portion of the optical fiber, a fiber bending member configured to cyclically moving a segment of the portion orthogonally to a longitudinal axis of the portion from an initial position. The fiber bending member is positioned adjacent the at least one holder and the movement changes a radius of a curvature of the portion.

18 Claims, 4 Drawing Sheets

(51) Int. Cl.
*G01L 1/24* (2006.01)
*G01M 11/08* (2006.01)
*G01N 21/39* (2006.01)

(58) Field of Classification Search
USPC .......................................................... 356/300
See application file for complete search history.

(56) References Cited

U.S. PATENT DOCUMENTS

| | | | | |
|---|---|---|---|---|
| 6,345,134 | B1 * | 2/2002 | Laming | G02B 6/29322 385/37 |
| 7,720,331 | B2 * | 5/2010 | Rennie | G02B 6/14 385/32 |
| 9,389,140 | B1 * | 7/2016 | Schildmeyer | G01M 11/088 |
| 10,842,359 | B2 * | 11/2020 | Fujita | G02B 23/26 |
| 10,962,415 | B2 * | 3/2021 | Waltermann | G01J 3/0218 |
| 2003/0169965 | A1 * | 9/2003 | Hanada | G02B 6/12007 385/32 |
| 2007/0263956 | A1 * | 11/2007 | Sappey | G01J 3/36 385/13 |
| 2008/0002186 | A1 * | 1/2008 | Masterson | G01J 3/42 356/73.1 |
| 2008/0192241 | A1 * | 8/2008 | He | G02B 6/2852 356/73.1 |
| 2009/0109698 | A1 | 4/2009 | Koyata et al. | |

FOREIGN PATENT DOCUMENTS

| | | | | |
|---|---|---|---|---|
| JP | S61110129 U | | 7/1986 | |
| JP | H0245786 Y2 | * | 12/1990 | |
| WO | WO-2018064822 A1 | * | 4/2018 | G01N 21/39 |
| WO | WO 2018/138472 A2 | | 8/2018 | |

OTHER PUBLICATIONS

Blake, Thomas A., et al. "Absorption spectroscopy in hollow-glass waveguides using infrared diode lasers." Diode Lasers and Applications in Atmospheric Sensing. vol. 4817. SPIE, 2002. (Year: 2002).*

International Search Report issued for International Patent Application No. PCT/EP2020/079112, dated Feb. 3, 2021 in 2 pages.

Written Opinion issued for International Patent Application No. PCT/EP2020/079112, dated Feb. 3, 2021 in 6 pages.

Petersburg et al., "Modal Noise Mitigation through Fiber Agitation for Fiber-fed Radial Velocity Spectrographs"; Arxiv.org, Cornell University Library, 201 Olin Library Cornell University Ithaca, NY 14853, Feb. 5, 2018.

Swedish Office Action issued for Swedish Patent Application No. 1951408-2, dated Apr. 28, 2020 in 8 pages.

Office Action issued in Chinese Application No. 202080083892.X, dated Dec. 27, 2024.

* cited by examiner

DEVICE FOR SMOOTHING SPECTRAL TRANSMISSION MODULATIONS AND A METHOD THEREOF

CROSS-REFERENCE TO RELATED APPLICATIONS

This application is the U.S. National Phase under 35. U.S.C. § 371 of International Application PCT/EP2020/079112, filed Oct. 15, 2020, which claims priority to Swedish Patent Application No. 1951408-2, filed Dec. 6, 2019. The disclosures of the above-described applications are hereby incorporated by reference in their entirety.

FIELD OF THE INVENTION

This disclosure pertains to a device, system and method for smoothing spectral transmission modulations of light in an optical fiber, in particular wavelength dependent transmission modulations. The device, system and method are especially used for reducing variation in a baseline when performing spectroscopic measurements with a light source having a wavelength that varies with time.

BACKGROUND OF THE INVENTION

Gas-in-scattering-media absorption spectroscopy (GASMAS) is based on measuring small variations of optical power transmitted through a medium while varying the optical wavelength, due to spectrally sharp absorption features of free gas. These variations may be on the order of 1% but could be as small as 0.02 to 0.2%. Variations of the source light power can be filtered in the post-processing of the acquired data, provided that the width of these variations significantly differs from the width of the gas absorption feature(s).

For example, the output power variations due to linearly scanning the wavelength by ramping the laser-diode current can easily be handled, e.g., by fitting the acquired signal to a low-order polynomial. However, laser light interference originating from weak reflections in millimetre thick optical components will provide power variation features for which the spectral widths are on the same order as the gas absorption features. These variations cannot be filtered out in the post-processing, but needs to be handled before the data is acquired.

Similar to the interference due to fixed optical components, the use of multi-mode optical fibers will result in small optical-power variations. These variations are formed as the light entering the fiber, is divided into different spatial modes, all with slightly different optical path length. After leaving the optical fiber, light of different modes will interfere and generate both spectral light power variations and equivalently spatial light intensity variation. The periodicity of the spectral variations covers a large interval, most of which can be digitally filtered in the post-processing, however, variations with spectral widths similar to the gas absorption features poses a problem.

This is particularly an issue when using TDLAS and the wavelength is swept over the absorption peak. A sweep where each step could be down to a scale below a nanometer. The interference of wavelength dependent transmission modulations will cause variations in the baseline over the width of the absorption peak which will affect the accuracy of the measurements.

In the art there are ways described to reduce speckle noise, especially to obtain a uniform light distribution spatially over a surface when used as a lamp, such as surgical lamp as in US 2018/0214237. This will provide a light which is spatially uniform but it is not described that the technology provides a homogen or uniform spectral transmission. The most common technics includes vibrating the fiber using ultrasound, forming part of the fiber to a loop which is kept static, twisting or rotating the fiber, applying a pressure on the fiber, etc.

U.S. Pat. No. 8,786,857 describes an apparatus and methods for measuring combustion parameters in the measurement zone of a gas turbine engine using tunable diode laser absorption spectroscopy ("TDLAS"). Means are provided in operative association with the multimode transmitting fiber for averaging modal noise induced signal level variation of light propagating within the multimode transmitting fiber and speckle noise. The proposed solution is used for reducing modal noise and/or speckle noise but does not discuss the issue with variation in the baseline, and particular not when sweeping a wavelength of a light over an absorption peak.

The solutions described in the art for reducing problems with spectral noise or model noise are in most cases related to solving the problem of providing an even light distribution, and are not related to spectroscopic measurements and the issues of variations in the baseline when changing the wavelength, especially not over the width of an absorption peak. Also, some of the solutions are quite complex or cannot be used for some environments, such as at a hospital or other environments where a high level of cleanness is required, such as disinfection, sterile or aseptic levels are required. Other examples of environment that may require a high level of cleanness are, for example, the food or pharma industry. A simpler and cheaper solution could therefore be an advantage.

Hence, a new improved apparatus and methods for reducing interference issues caused by transmission modulation during light-based measurements, such as spectroscopy-based measurements, could be advantageous. Especially a method suitable to be used when performing measurements on free gas, such as during medical diagnosis or monitoring purposes.

SUMMARY OF THE INVENTION

Accordingly, embodiments of the present disclosure preferably seek to mitigate, alleviate or eliminate one or more deficiencies, disadvantages or issues in the art, such as the above-identified, singly or in any combination by providing a device, system or method according to the description for smoothing spectral transmission modulations in an optical fiber.

According to one aspect of the disclosure, a device for smoothing spectral transmission modulations in an optical fiber is described. The device may include at least one holder for coupling a portion of the optical fiber to the device and a fiber bending member configured to cyclically moving a segment of the portion orthogonally to a longitudinal axis of the portion from an initial position. The fiber bending member may be positioned adjacent the at least one holder and whereby the movement changes a radius of a curvature of the portion.

In some examples of the disclosure may the device include two of the at least one holder, and the portion and the fiber bending member are arranged between the two holders.

In some examples of the disclosure may at least one of the two holders be configured for slidingly hold the optical fiber.

This may allow the portion to slide in a longitudinal axial direction in the at least one of the two holders when the segment is being moved.

In some examples of the disclosure may the fiber bending member be an actuator connected to a first holder of the two holders and being configured for cyclically moving the first holder towards a second holder of the two holders and then away from the second holder. This may allow the segment to move orthogonally to a longitudinal axis of the portion from the initial position and then back to the initial state.

In some examples of the disclosure may the bending member be a force applying member. The force applying member may be configured for applying a force on the portion orthogonally to a longitudinal axis of the portion, thereby moving the segment. The force may be a mechanical force, pushing at the portion orthogonally to the longitudinal axis to change the radius of the curvature.

In some example of the disclosure may the radius be larger than a minimum bend radius of the optical fiber, when the segment is moved, for example when a force is applied thereon.

In some examples of the disclosure may the two holders be arranged for positioning the portion in the initial position as a straight position, before the segment is moved. For example when the segment is not moved, such as when no force is applied on the segment by the fiber bending member.

In some examples of the disclosure may the at least one holder be a slit configured to hold the optical fiber.

In some examples of the disclosure may the fiber bending member be a motor rotating at least one blade configured to move the segment, such as by applying a force cyclically.

In another aspect of the disclosure, a system for smoothing spectral transmission modulations in an optical fiber is described. The system may include a device or smoothing spectral transmission modulations as herein described, an optical fiber having a portion of its length arranged in the device; and a light source connected to the optical fiber.

In some examples may the light source be emitting light with a variable wavelength.

In yet another aspect of the disclosure, a method of smoothing spectral transmission modulations in an optical fiber is described. The method may include coupling the optical fiber to at least one holder, and moving a segment of the fiber orthogonally to a longitudinal axis of the optical fiber cyclically using a fiber bending member which may be arranged adjacent the at least on holder. Moving the segment changes a radius of a curvature of the portion.

In some examples may the method include coupling the optical fiber to two holders, thereby arranging a portion of the optical fiber between the two holders. The method may then include using the fiber bending member arranged between the two holders to move the segment being part of the portion.

In some examples may the method include transmitting a light through the optical fiber for carrying out a spectroscopic measurement.

In some examples of the method may the light have a wavelength which may be varied over time.

In some examples may the method include varying the radius with a time of a period being the same as a measuring time for one wavelength.

The disclosure further describes use of a device smoothing spectral transmission modulations in an optical fiber as herein described for reducing variations in a baseline when carrying out a spectroscopic measurement.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the disclosure are capable of will be apparent and elucidated from the following description of examples of the present disclosure, reference being made to the accompanying drawings, in which.

DETAILED DESCRIPTION OF THE PREFERRED EMBODIMENTS

Figure 1A:
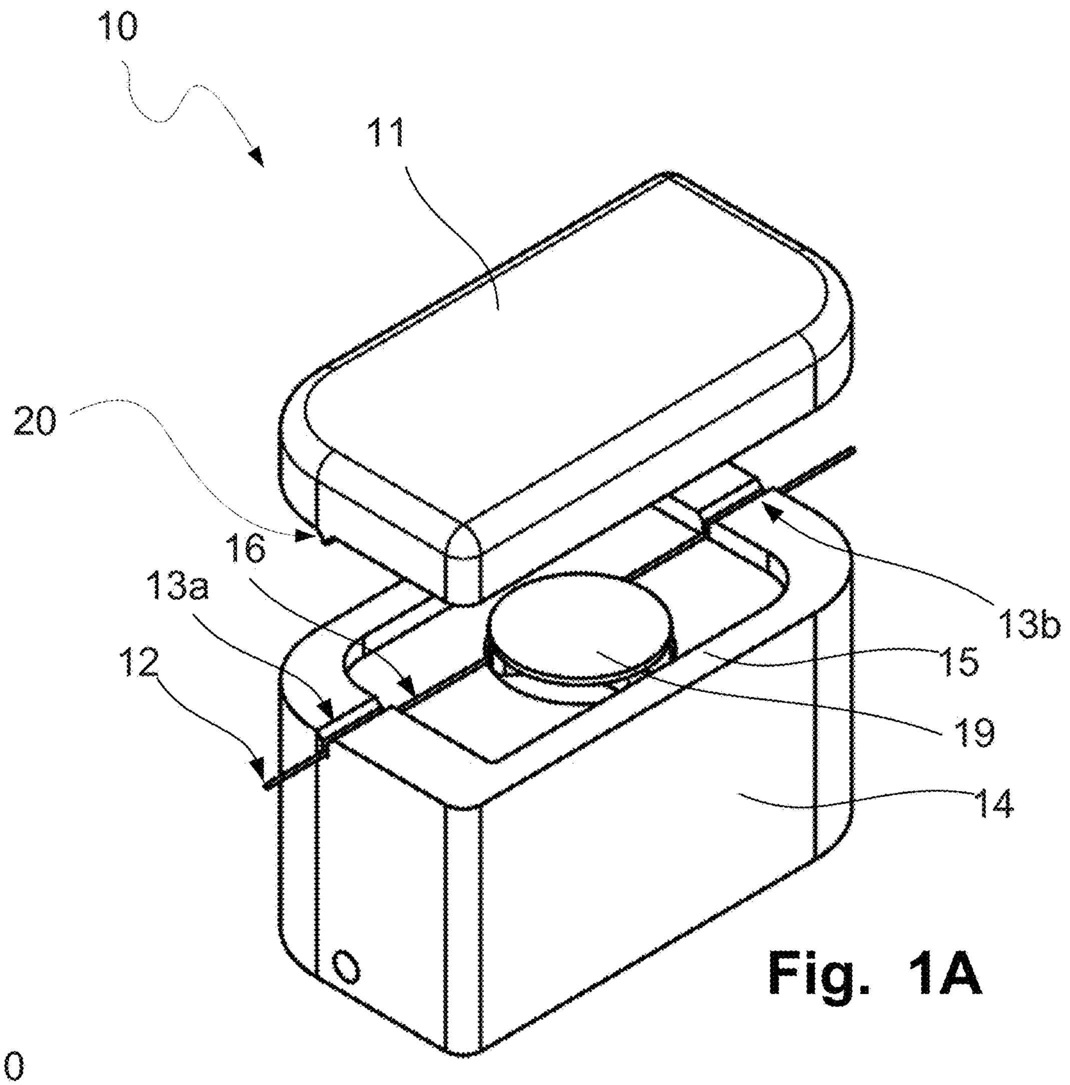
FIGS. 1A and 1B are illustrating a schematic example of a disclosed device for smoothing transmission modulations.

Specific examples of the disclosure will now be described with reference to the accompanying drawings. This disclosure may, however, be embodied in many different forms and should not be construed as limited to the examples set forth herein; rather, these examples are provided so that the disclosure will be thorough and complete, and will fully convey the scope of the disclosure to those skilled in the art.

Provided that the spectral gas absorption features remain constant during the acquisition time of the measurement, the interference signal generated in a multi-mode fiber may be observed as spectral transmission modulations.

The term "interference" should here be interpreted to have its general meaning within the art of optics, i.e. superposition of one or more waves. At every given instant or moment, the light transmitted through a fiber may be observed as being stagnated and the light waves with different modes may interfere with each other after being transmitted through the fiber. For some wavelengths may the interference be weakly constructive and for some wavelengths may the interference be weakly destructive. Should it be possible to sweep the wavelength with an infinite speed or if white light was transmitted through the fiber, spectral transmission modulations (relatively weak) may be observed.

The spectral transmission modulations may be smoothened by varying the way the different modes interfere during an acquisition period when, at the same time, the wavelength is swept over a wavelength range. The wavelength range may be the width of an absorption peak. Varying the way the different modes interfere may be done by varying the optical path length differently for the different modes of the fiber.

The inventor has found that one way to smooth the spectral transmission modulations could be by changing a radius of curvature over a short portion of an optical fiber, such as mechanically changing a radius of curvature. At each instant during the bending of the portion of the fiber to obtain the changing radius of curvature, constructive and destructive interference between light waves with different modes may vary due to the degree of which the portion has been curved. By varying the curvature during an acquisition, exposure, or integration period when, at the same time, the wavelength is swept over a wavelength range, the spectral transmission modulations may be smoothened. This may reduce variations in a baseline when carrying out a spectroscopic measurement.

The portion of the fiber to be bent to obtain a change in the radius of the curvature may be transversally held in place at two points separated by a distance which defines the portion. The portion of the fiber may have a length of less than 10 cm, such as less than 5 cm.

The fiber may be allowed to move longitudinally between the two points. The fiber may have an initial shape before a force is applied, such as being in a relaxed position having a straight extension. The changing of the radius of curvature, such as the bending of the portion, may be obtained by moving a segment of the transversally held fiber portion orthogonally in relation to a longitudinal axis of the fibre portion. Thereby bending the portion of the fiber.

The segment could be a point along the length of the transversally held fiber portion.

In some examples, moving a segment of the transversally held fiber portion is obtained by applying a force. When a force is applied on the portion of the fiber orthogonally in relation to a longitudinal axis of the fibre portion, a change in a radius of a curvature of the portion is obtained. When the force is not applied to the portion of the fiber, the portion may resiliently spring back to the initial shape.

The optical fiber may be part of a probe for transmitting light to a measuring site. Reflected and/or backscattered light could then either be transmitted back in the same fiber, or be detected by a separate detection system.

The advantages of the device and method described herein, apart from providing a reduction of the interference, provide for an easy way to disconnect and connect a fiber probe to the device. The few components and the housing, make the device easy to clean and to make the device contamination free. Hence the device is suitable to be used in environments where a high level of cleanness is required, such as where disinfection, sterile or aseptic levels are required. This could for example be in a hospital, or the food and pharma industry.

Figure 1B:
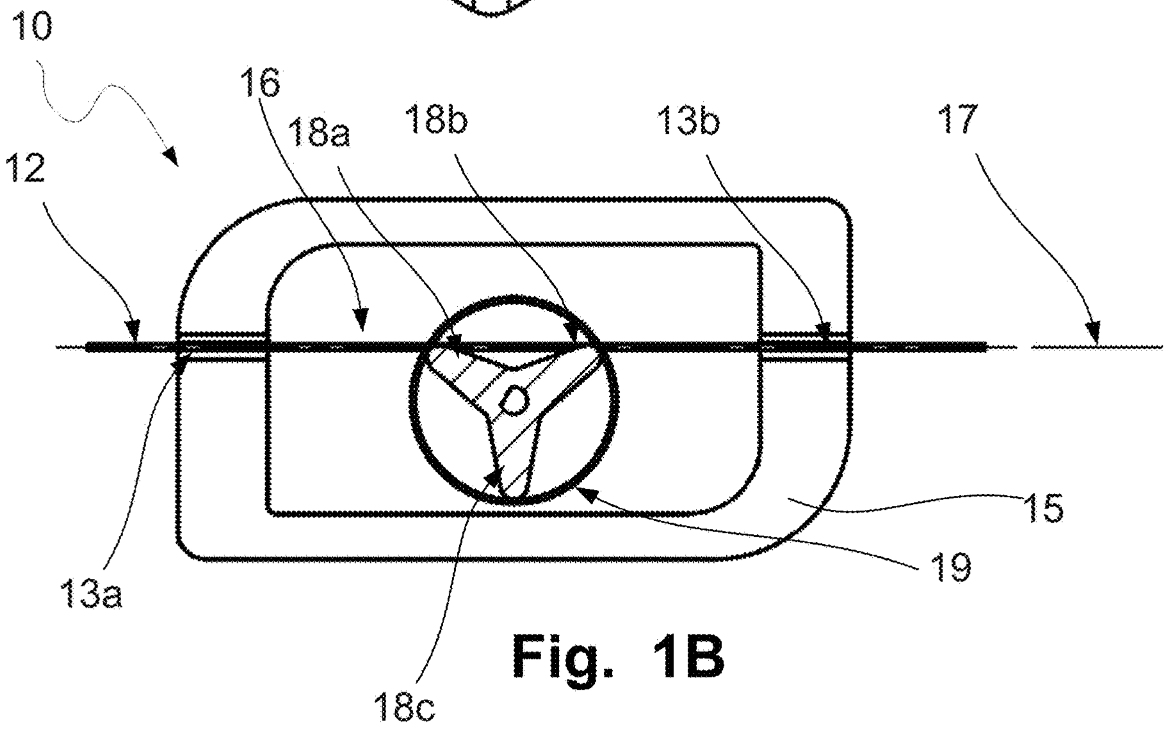

FIGS. 1A and 1B are illustrating a schematic example of a disclosed device 10 for smoothing spectral transmission modulations according to the disclosure. FIG. 1A is illustrating a perspective view and FIG. 1B is illustrating a top view of the schematic example of a device 10 for smoothing spectral transmission modulations.

The interference may be an interference of wavelength dependent transmission modulations. These may cause variations in the baseline of a spectrum when the wavelength is swept over a wavelength range, such as when using TDLAS. Variations in the baseline may provide less accuracy when performing measurements in which the wavelength is swept over a narrow absorption peak, such as an absorption peak of a free gas.

The optical fiber 12 may be positioned in two holders 13*a*, 13*b* to couple to fiber 12 to the device 10. The holders 13*a*, 13*b* may be arranged on two opposite sides of a fiber bending member 19 used for moving a segment of the portion of the fiber orthogonally to a longitudinal axis of the portion of the fiber. The fiber bending member may also be a force applying member.

This arrangement may allow positioning of a portion 16 of a length of the fiber 12 in a straight position between the two holders 13*a*, 13*b*, for example, when no force is applied thereon by the fiber bending member 19.

In some examples, the holders 13*a*, 13*b* may be slits formed in a protruding or raised edge 15 which may surround the fiber bending member 19. Other arrangements for coupling the fiber 12 to the device 10 may also be possible, for example the holders 13*a*, 13*b* may be holes through the protruding or raised edge 15 through which the fiber 12 is threaded. In some examples, there is no edge 15, instead are the holders 13*a*, 13*b* discrete features on either side of the fiber bending member 19, i.e. the two holders 13*a* and 13*b* are separated features not connected by, for example, the protruding or raised edge 15.

To allow the fiber 12 to move longitudinally between the two points when the segment is moved, such as when a force is applied thereon, at least one of the two holders 13*a*, 13*b* may be configured to slidingly hold the optical fiber 12. This may allow the portion 16 to slide in a longitudinal axial direction 17 in at least one of the two holders 13*a*, 13*b* when the segment is moved orthogonally to the longitudinal axis of the portion 16 by the fiber bending member 19, such as when the force is applied to the portion. Preferably, both holders 13*a*, 13*b* are configured to slidingly hold the optical fiber 12.

A distance between the two holders 13*a*, 13*b* may be defining a portion 16 of the optical fiber 12 for which a segment is moved to change a radius of a curvature of the portion 16, for example by applying a force thereon. The fiber bending member 19 is configured for cyclically, such as periodically, moving a segment of the portion. For example, the segment may be moved by applying a force on the portion 16. The force may be applied orthogonally to a longitudinal axis 17 of the portion 16 of the fiber 12. The force changes a radius of a curvature of the portion 16, when being applied thereon.

When the segment is moved, a minimal radius of curvature on the order of a few centimeters is obtained. The radius of curvature required to obtain the effect may depend on the type of fiber and the size. In one example, for a 400 μm fiber the radius of curvature may be in the range 60 mm to 100 mm, such as 80 mm, for a 200 μm fiber the radius of curvature may be in the range 15 mm to 50 mm, such as 30 mm to 40 mm.

In some examples, the radius may be larger than a minimum bend radius of the optical fiber 12, when segment of the portion 16 is moved to its maximal position.

In some examples, the fiber bending member 19 is configured for applying a mechanical force by pushing at the portion 16. The force may be applied orthogonally to the longitudinal axis 17 of the portion 16 to change the radius of the curvature. The skilled person will appreciate that there are many ways of applying a pushing force, such as a rod moved with a linear motor with a reciprocating motion.

Alternatively to using two holders, the devices and methods described above may be configured to only use one holder, such as at least one holder. The fiber bending member may then be arranged adjacent the holder instead of between two holders. When the fiber bending member moves a segment of the fiber, the fiber may be bent in relation to the holder whereby a varied radius of curvature is provided.

In another example, a portion of the fiber may be bent to provide a varied radius of curvature by having a fiber transversally held in place at two points separated by a distance which defines a portion. By changing the distance between the holders, a segment of the portion will move and the fiber portion will bend and a varied radius of curvature is obtained over the defined portion.

The distance between the holders may be changed by connecting one or both of the holders to an actuator which may function as a fiber bending member.

The holders used for holding the fiber portion are configured to prevent the fiber portion to move longitudinally therein.

In a further example, one of the two holders are connected to an actuator which may change the direction of the fiber, such as turning that holder, whereby the portion of the fiber arranged between the two holders may bend and the radius of the curvature is varied. The holder arranged on the actuator may function as a fiber bending member.

In this example, one or both holders may be configured to allow the fiber to slide therein. The holder connected to an actuator may be a slit having a length, such as between 1 and 3 cm, such as 2 cm. The actuator may be a servo motor. The slit of the holder connected to the actuator may define a direction of the fiber and when the the holder is turned the direction will change, whereby the portion of the fiber arranged between the two holders may bend.

In FIGS. 1A and 1B, the segment is moved by a motor rotating at least one blade 18*a*, 18*b*, 18*c*. The motor is not illustrated in the figures as it is arranged inside the housing 14. The housing 14 may be made of plastic or metal and may be moulded as one piece. A lid 11 may be arranged on top of the housing 14 to protect or seal the area around portion 16 of fiber 12. The lid may have a notch 20 which fits into the holders 13*a*, 13*b* to restrict the movement of the fiber 12 in any other direction than along the longitudinal axial direction 17 of the portion 16 of the fiber 12.

When rotating, the blade 18*a*, 18*b*, 18*c* may gradually increase the curvature from an initial shape of the portion 16, such as a straight extension until a maximal curvature is reached. The curvature may then gradually decrease until the portion 16 of the optical fiber 13 retains its initial shape again. The process may be assisted by the resilient properties of the optical fiber 12. The resilient properties of the fiber 12 may provide a spring back effect so that the portion 16 retains its initial shape when the portion 16 is released.

In the example illustrated in FIGS. 1A and 1B, a wheel with three blades 18*a*. 18*b*, 18*c* is connected to an electric motor. When the wheel is rotated, the three blades 18*a*, 18*b*, 18*c* push the portion 16 of the fiber 12 out from its relaxed position three times per revolution. Thereby creating a minimal radius of curvature on the order of a few centimetres three times per rotation.

In some example may the curvature be varied periodically with a time period equal to the measurement time, such as an acquisition, exposure, or integration period. For example, one measurement may be performed during a time period wherein the radius of a curvature of a fiber portion varies from an initial shape to a maximal curvature. Then another measurement may then be performed from a maximal curvature back to an initial shape of the fiber portion. This may be performed, for example, by a half a blade 18*a*, 18*b*, 18*c*, of a wheel as illustrated in FIGS. 1A and 1B.

In another example, one measurement may be performed during a time period wherein the radius of a curvature of a fiber portion varies from an initial shape to a maximal curvature and back to an initial shape. This may be performed, for example, by half one blade 18*a*, 18*b*, 18*c*, of a wheel as illustrated in FIGS. 1A and 1B.

In yet another example, one measurement may be performed during a time period wherein the radius of a curvature of a fiber portion varies more than one time, such as at least two times such as three times, from an initial shape to a maximal curvature and back to an initial shape. This may be performed, for example, by a full turn of a wheel as illustrated in FIGS. 1A and 1B.

Figure 2:
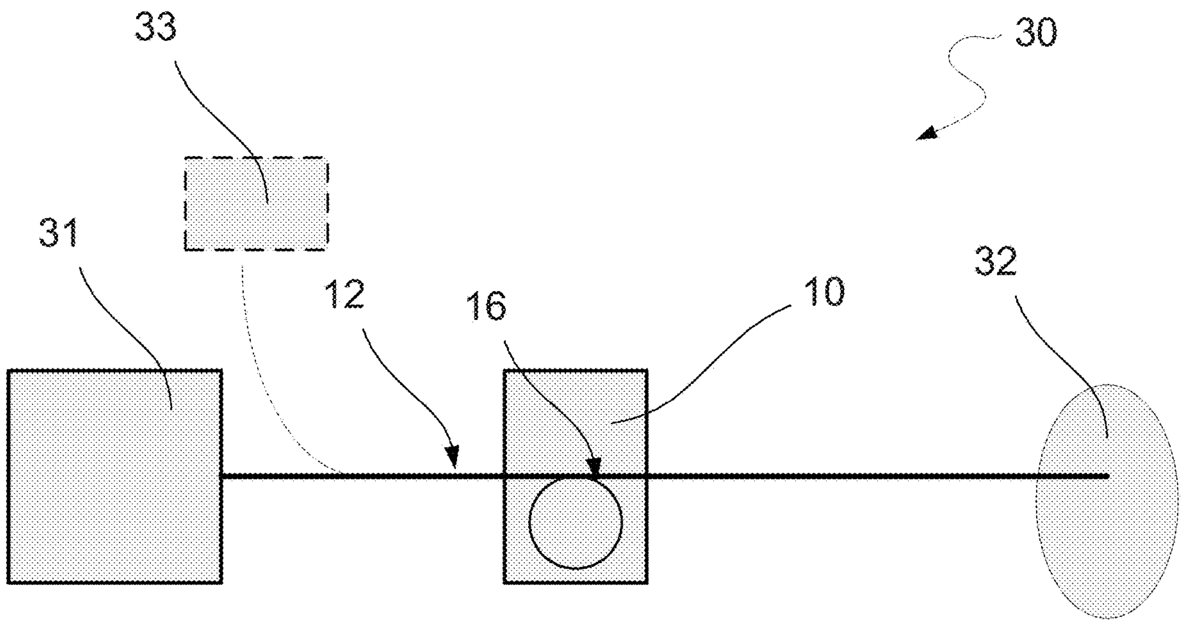
FIG. 2 is illustrating a schematic system for smoothing transmission modulations.

FIG. 2 is illustrating a schematic system 30 for smoothing spectral transmission modulations, such as interference of optical modes in a fiber. The system is configured for performing spectroscopically based measurements using TDLAS. This includes Gas in Scattering Media Absorption Spectroscopy (GASMAS). The system 30 includes a device for smoothing spectral transmission modulations 10 as described herein. The system 30, further includes a light source 31. The light source may emit light with a variable wavelength. The light sources 31 may be a laser, such as diode lasers or semiconductor lasers, for example distributed feed-back lasers (DFBL), vertical cavity surface emitting lasers (VCSEL), or other types of available lasers.

The optical fiber 12 is connected to the light source and a portion 16 of the optical fiber 12 is connect to the device for smoothing spectral transmission modulations 10.

The optical fiber 12, is arranged to transmit light from the light source 31 to a sample, 32. The sample 32 could be a tissue site of a subject to be examined or a cavity with a free gas to be monitored. A cavity could be, for example, parts of the pulmonary system, such as a lung or parts of the bronchial tree. The cavity may also be a sinus cavity of a subject.

For a probe to transmit the light to an internal site, a member for introducing the light sources for injecting the light into the tissue, for example, a bronchoscope, a nasogastric feeding tube, endoscope, a tracheal tube, a colonoscope or similar introducing members, may be utilized.

A separate detector may be used for detecting the light transmitted through the sample 32 or backscattered from the sample 32. Alternatively, the optical fiber 12 may be used for transmitting the light transmitted through the sample 32 or backscattered from the sample 32 to a detector 33.

Figure 3:
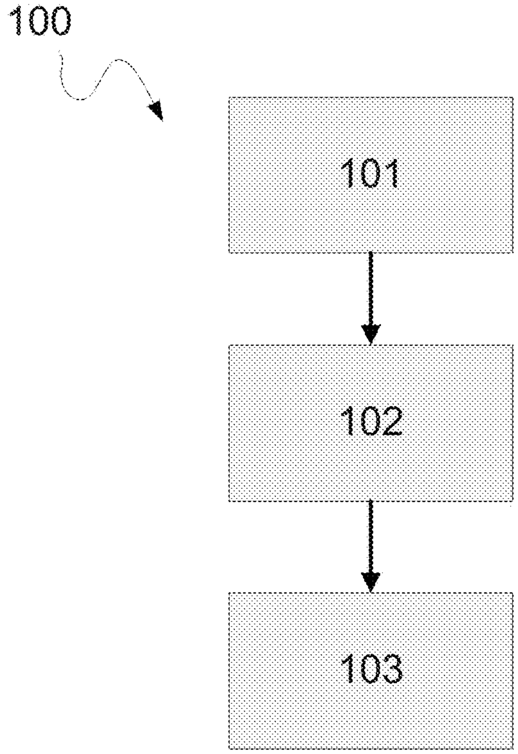
FIG. 3 is illustrating a schematic example of flow chart of a described method.

FIG. 3 is illustrating a schematic example of flow chart of a disclosed method 100 of smoothing spectral transmission modulations in an optical fiber. The interference may be an interference of wavelength dependent transmission modulations.

The method 100 is particularly useful when performing spectroscopic measurements where the light has a wavelength which is varied over time, such as TDLAS. The method may provide a reduction in variations in a baseline when carrying out a spectroscopic measurement. The method may include:

Arranging a portion 101 of an optical fiber between two holders. The holders may be part of a device for smoothing spectral transmission modulations as described herein.

Moving a segment of the portion 102, such as applying a force, cyclically, such as periodically, to a portion of the fiber. The segment may be moved orthogonally to a longitudinal axis of the portion of the fiber, such as by applying a force orthogonally to a longitudinal axis of the portion of the fiber. Moving the segment will be changing a radius 103 of a curvature of the portion.

The method may include varying the radius with a time of a period being the same as a measuring time, such as an integration time, for one wavelength of the light source.

EXAMPLE

To illustrate the performance of an implementation a TDLAS platform was used to drive a light source with a fiber-coupled diffusor probe and to acquire the optical signal from a photodiode a few centimeters away from the source probe in air. In addition, an optical imaging system is used to evaluate the spatial intensity distribution from the source probe.

Figure 4A:
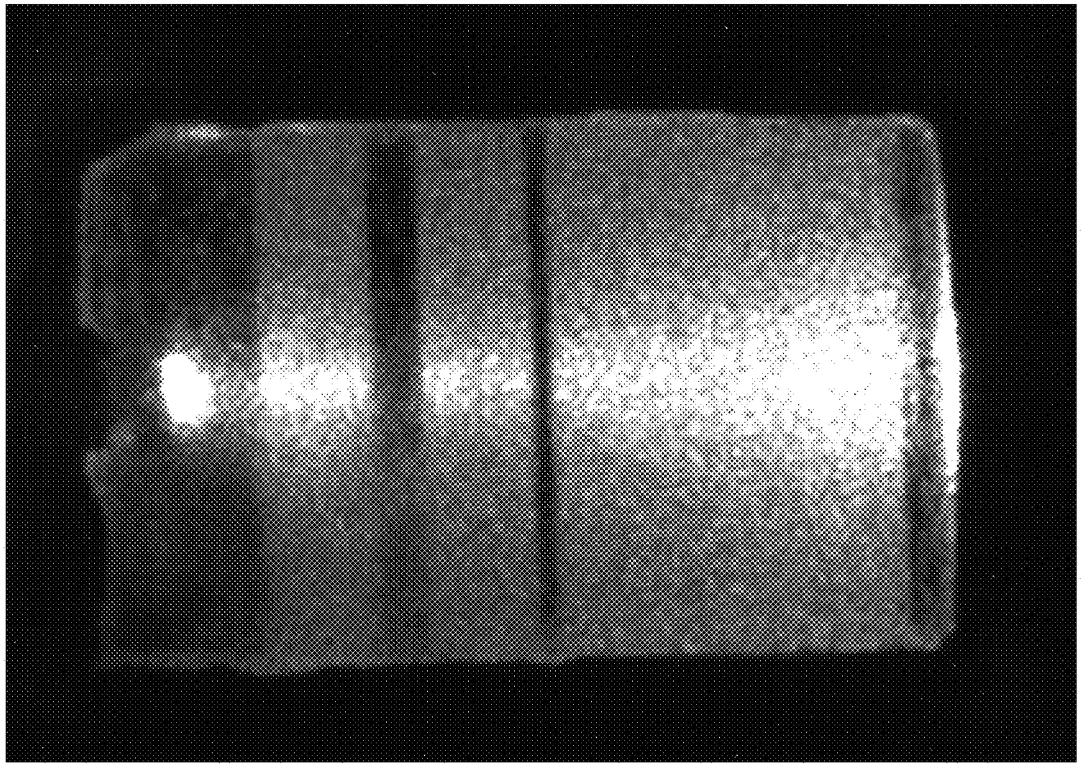
FIGS. 4A and 4A are illustrating images of a fiber coupled source probe with diffusor both without the smoothing device inactivated and with the smoothing device activated.
Figure 4B:
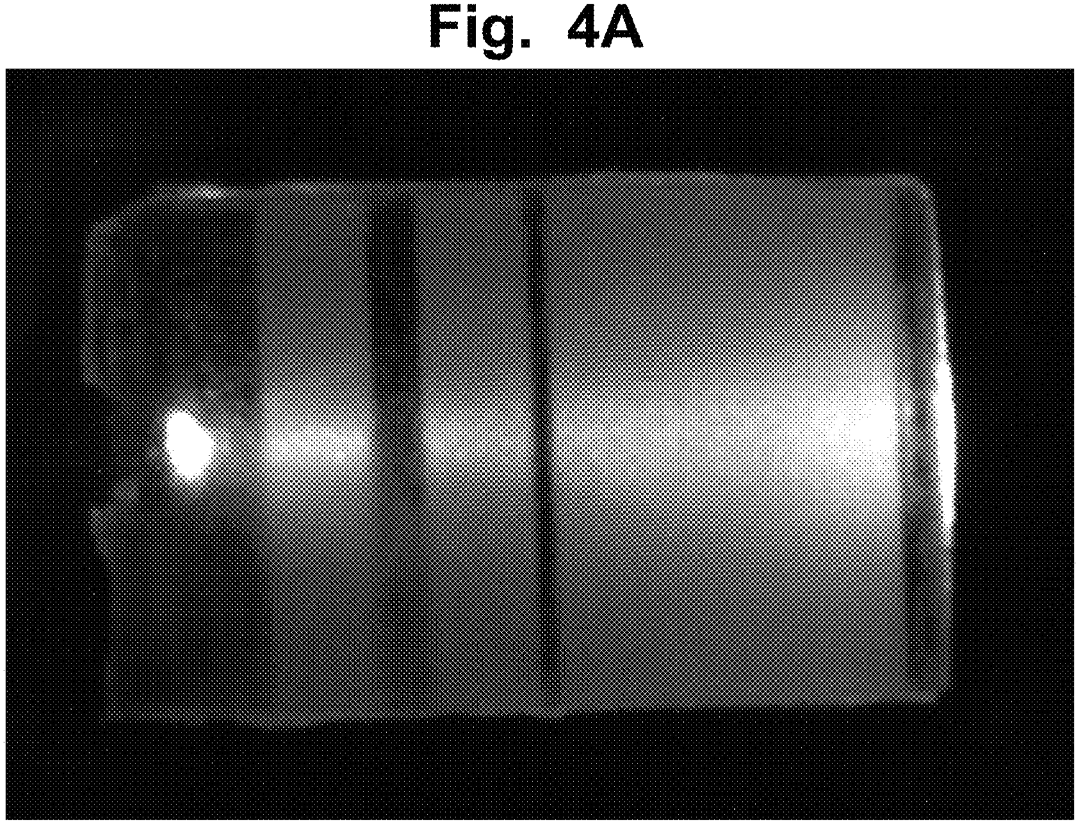

In FIGS. 4A and 4B, images of the output of the source diffusor probe are shown with and without the device for smoothing spectral transmission modulations switched on. The speckles seen in the FIG. 4A are the result of interference of the optical modes in the fiber, which remain constant during the acquisition time of the camera. In FIG. 4B, the speckles are eliminated due a radius of curvature of a segment of the fiber being varied over the image exposure time.

Figure 5A:
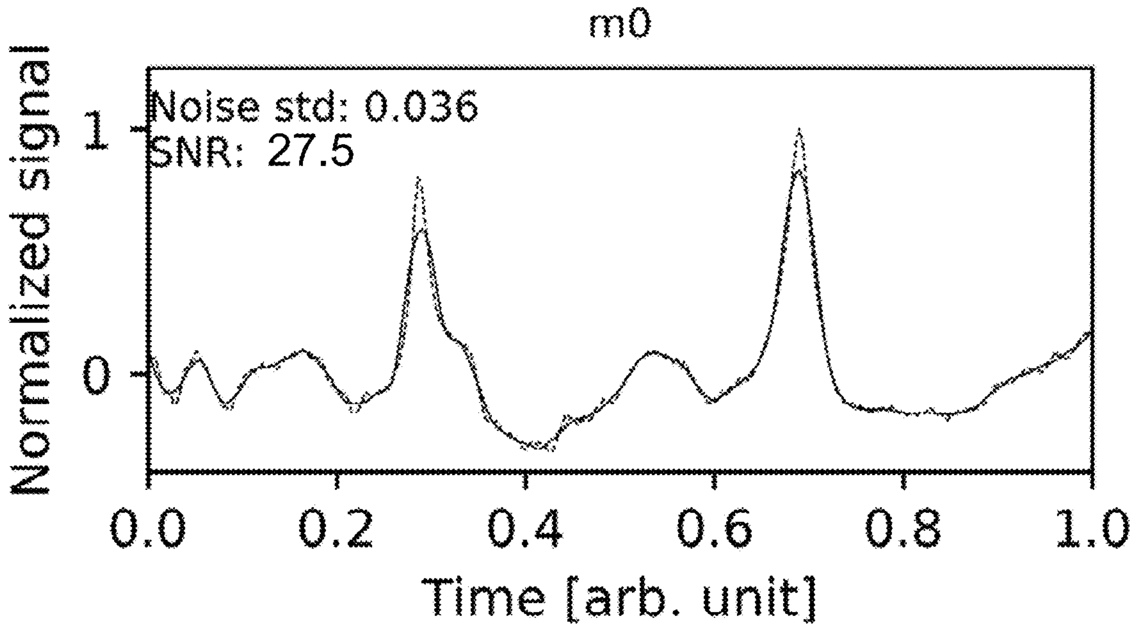
FIGS. 5A and 5B are illustrating optical absorption signal normalized to the maximum peak in each signal, both without the smoothing device inactivated and with the smoothing device activated.
Figure 5B:
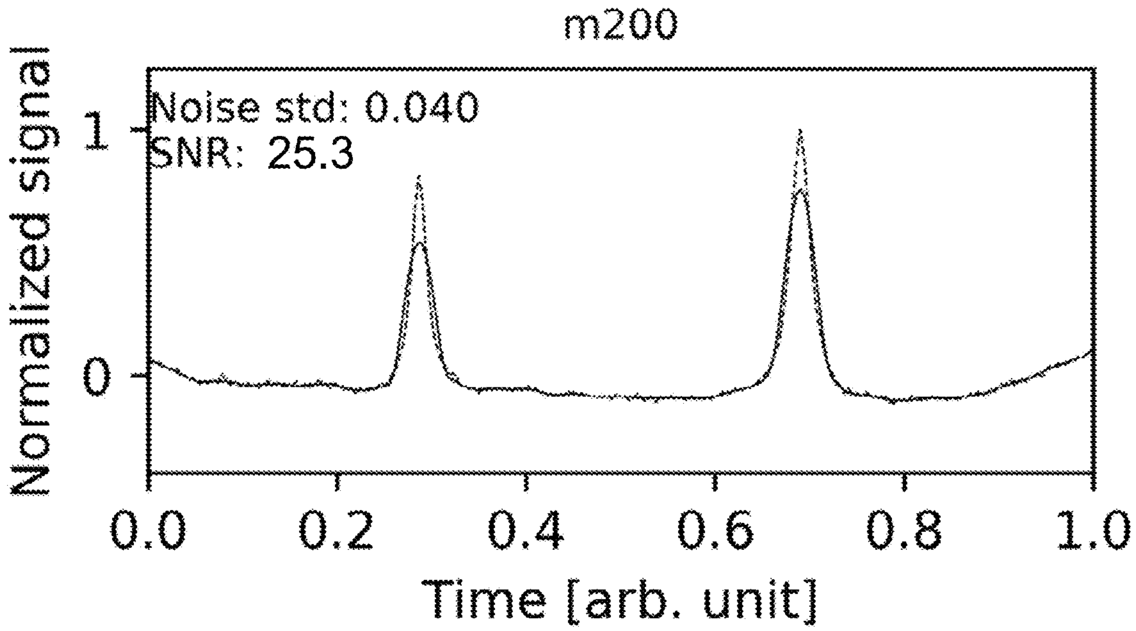

In FIGS. 5A and 5B, a sample of the absorption signal acquired using the TDLAS platform is shown both with and without the device for smoothing spectral transmission modulations switched on. Similar to the spatial speckle pattern seen in FIGS. 4A and 4B, the absorption signal contains large variations in the signal around the true gas absorption peaks when the device is switched off, FIG. 5A. These variations are essentially eliminated by switching the device on, FIG. 5B.

The optical absorption signal acquired is normalized to the maximum peak in each signal, both without the device switched on, seen in FIG. 5A, and with the device switched on, seen in FIG. 5B. Two gas absorption features are clearly seen in both signals. However, variations with an amplitude of approximately 25% of the true absorption peaks are seen in the signal when the device is turned off. These variations originate from interference between fiber modes. The signal quality is significantly improved when the motor is started. This is showing conclusively that the solution presented herein reduces, and can even be said to eliminate, variations in the absorption signal due to interference originating from the optical fiber. The device improves the sensitivity of spectroscopic measurements, such as TDLAS measurements, using optical fibers.

The present invention has been described above with reference to specific examples. However, other examples than the above described are equally possible within the scope of the disclosure. Different method steps than those described above, performing the method by hardware or software, may be provided within the scope of the invention. The different features and steps of the invention may be combined in other combinations than those described. The scope of the disclosure is only limited by the appended patent claims.

The indefinite articles “a” and “an,” as used herein in the specification and in the claims, unless clearly indicated to the contrary, should be understood to mean “at least one.” The phrase “and/or,” as used herein in the specification and in the claims, should be understood to mean “either or both” of the elements so conjoined, i.e., elements that are conjunctively present in some cases and disjunctively present in other cases.

What is claimed is:

1. A system comprising:

a light source connected to a first end of an optical fiber, wherein said light source is configured to be swept over a wavelength range for performing a spectroscopic measurement based on tunable diode laser absorption spectroscopy (TDLAS); and a device for smoothing spectral transmission modulations in said optical fiber during said spectroscopic measurement, the device comprising:

at least one holder configured to couple a portion of said optical fiber to said device; and a fiber bender configured to cyclically move a segment of said portion orthogonally to a longitudinal axis of said portion from an initial position continuously during said spectroscopic measurement, wherein said fiber bender is positioned adjacent to said at least one holder and whereby said movement changes a radius of a curvature of said portion, thereby smoothing the spectral transmission modulations in the optical fiber by reducing interference originating from the optical fiber, wherein said smoothing of said spectral transmission modulations in the optical fiber reduces variations in a baseline when carrying out said spectroscopic measurement using light emitted from a second end of said optical fiber.

2. The system of claim 1, wherein said light source is a diode laser emitting light with a variable wavelength.

3. The system of claim 1, wherein said radius is larger than a minimum bend radius of said optical fiber when a force is applied thereon.

4. The system of claim 1, wherein said fiber bender is a motor rotating at least one blade configured to move said segment by applying a force cyclically.

5. The system of claim 1, wherein the device comprises two of said at least one holder, and said portion and said fiber bender are arranged between said two holders.

6. The system of claim 5, wherein at least one of said two holders is configured for slidingly hold said optical fiber, whereby said portion slides in a longitudinal axial direction in said at least one of said two holders when said segment is moved.

7. The system of claim 5, wherein said fiber bender is an actuator connected to a first holder of said two holders and being configured for cyclically moving said first holder towards a second holder of said two holders and then away from said second holder, whereby said segment moves orthogonally to a longitudinal axis of said portion from said initial position and then back to said initial position.

8. The system of claim 5, wherein said two holders are arranged for positioning said portion in said initial position as a straight position, before said segment is moved.

9. The system of claim 1, wherein said fiber bender is a force applier configured to apply a force on said portion orthogonally to a longitudinal axis of said portion, thereby moving said segment.

10. The system of claim 9, wherein said force is a mechanical force, pushing at said portion orthogonally to said longitudinal axis to change said radius of said curvature.

11. The system of claim 9, wherein said initial position is when no force is applied thereon by said fiber bender.

12. The system of claim 1, wherein said radius is larger than a minimum bend radius of said optical fiber, when said segment is moved.

13. The system of claim 1, wherein said at least one holder is a slit configured to hold said optical fiber.

14. The system of claim 1, wherein said fiber bender is a motor rotating at least one blade configured to move said segment.

15. A method of smoothing spectral transmission modulations in an optical fiber, comprising:

coupling said optical fiber to at least one holder;

moving a segment of said optical fiber, using a fiber bender arranged adjacent to said at least on holder, orthogonally to a longitudinal axis of said optical fiber cyclically, wherein said moving of said segment changes a radius of a curvature of said segment; and sweeping a light source, connected at a first end to said optical fiber, over a wavelength range for performing a spectroscopic measurement using tunable diode laser absorption spectroscopy (TDLAS) based on light emitted from a second end of said optical fiber, such that variations in a baseline are reduced due to smoothing of said spectral transmission modulations in the optical fiber when carrying out said spectroscopic measurement.

16. The method of claim 15, comprising coupling said optical fiber to two holders, thereby arranging a portion of said optical fiber between said two holders, using said fiber bender arranged between said two holders to move said segment being part of said portion.

17. The method of claim 15, wherein said light source is a diode laser and has a wavelength which is varied over time.

18. The method of claim 17, comprising varying said radius with a time of a period being the same as a measuring time for one wavelength.

* * * * *